Nov. 12, 1963

A. J. DE STASI 3,110,404

MOBILE TYPE CRANE

Filed July 31, 1961

INVENTOR.
ANTHONY J. DE STASI
BY
Bruce & Brosler
HIS ATTORNEYS

Nov. 12, 1963  A. J. DE STASI  3,110,404
MOBILE TYPE CRANE
Filed July 31, 1961  2 Sheets-Sheet 2
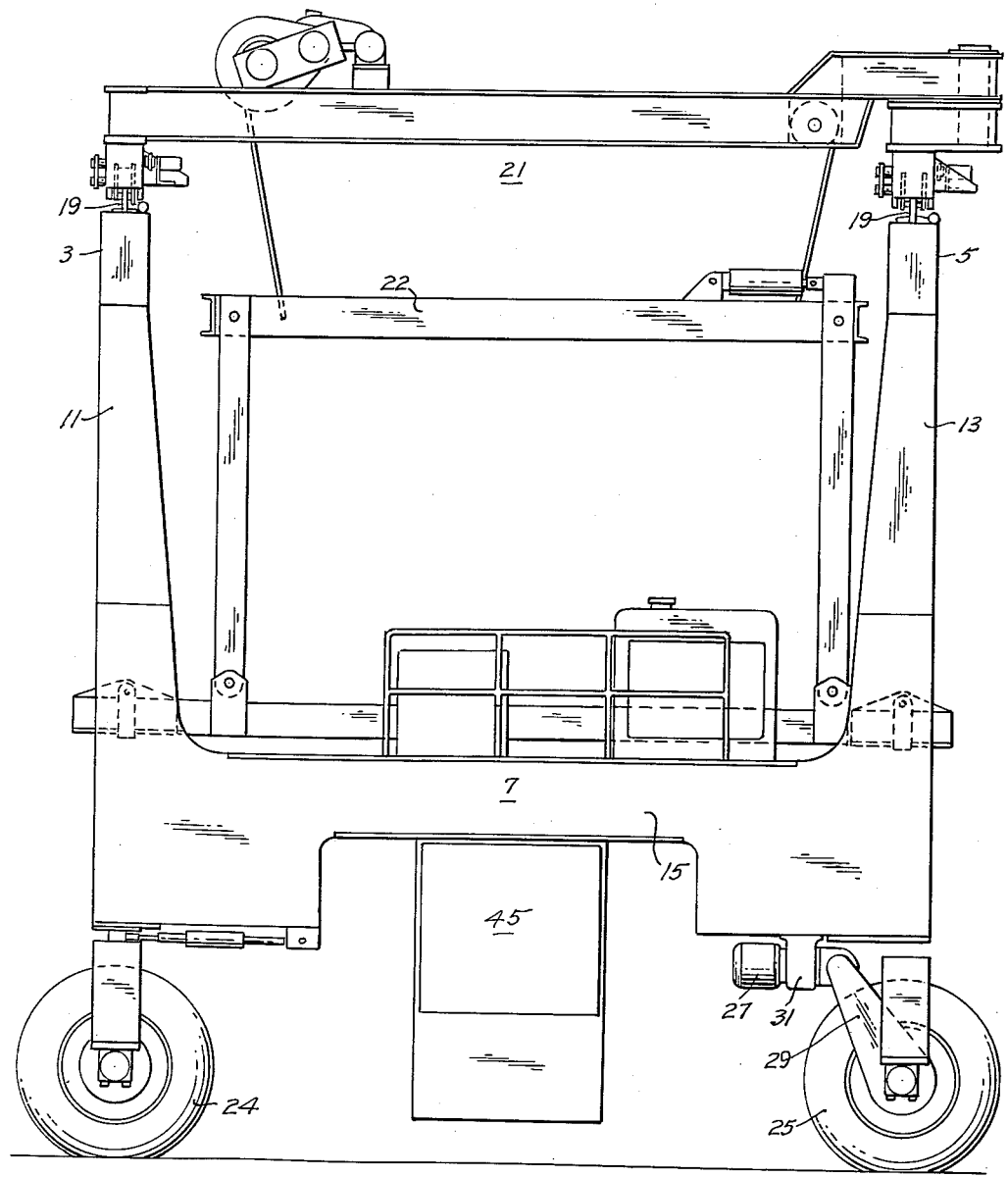
INVENTOR.
ANTHONY J. DE STASI
BY
Bruce & Brosler
HIS ATTORNEYS

United States Patent Office 3,110,404
Patented Nov. 12, 1963

3,110,404
MOBILE TYPE CRANE
Anthony J. De Stasi, Oakland, Calif., assignor to Pacific Coast Engineering Company, a corporation of California
Filed July 31, 1961, Ser. No. 127,936
4 Claims. (Cl. 212—13)

My invention relates to cranes and more particularly to one of the cargo handling carrier type for the handling of cargo and the like.

The carrier type crane involved is particularly useful in the transfer of cargo from one position of rest to another, as when transferring cargo between a railroad car and truck or trailer, or from either to a location of storage . . . etc., in the course of which, it will be appreciated that the carrier will inevitably have to travel over obstacles such as tracks, stones or other rough terrain, which is apt to cause excessive shock, and torsional, twisting and other complex stresses and strains to be set up in the structure of the carrier, besides upsetting the stability and balance of the load being carried, and particularly when such load is suspended by cables.

Among the objects of my invention are:

(1) To provide a novel and improved cargo handling carrier which can negotiate rough terrain without causing excessive torsional or twisting stresses and strains to be set up in its structure;

(2) To provide a novel and improved cargo handling carrier which can negotiate rough terrain with a minimum of disturbance to cargo being carried.

Additional objects of my invention will be brought out in the following description of a preferred embodiment of the same, taken in conjunction with the accompanying drawings wherein:

FIG. 3 is a corresponding elevational view of the same carrier as viewed from the opposite end.

Figure 1:
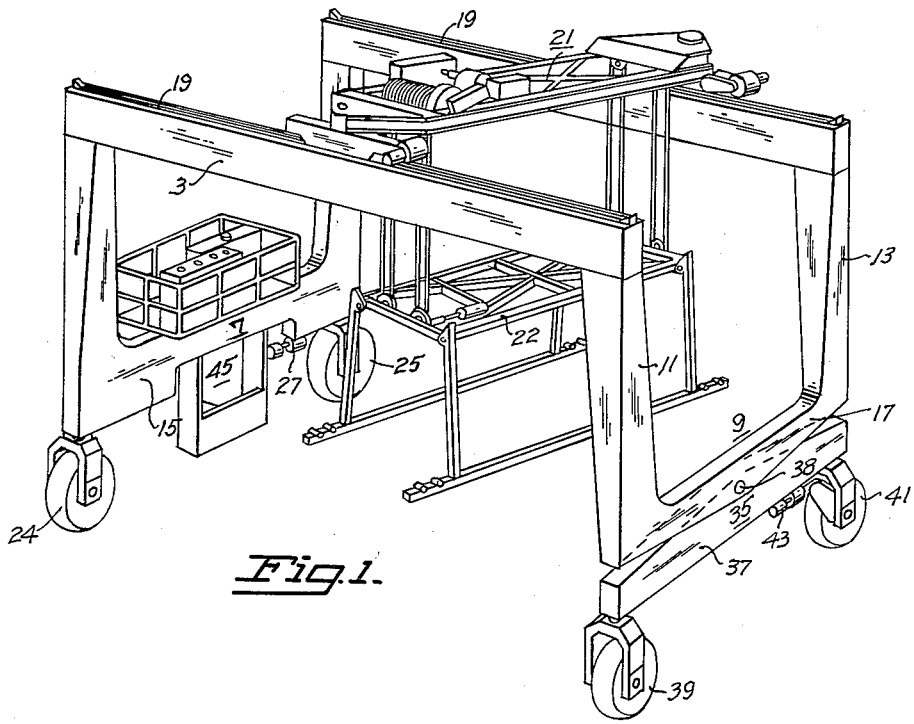
FIG. 1 is a 3-dimensional view depicting the invention in its preferred form as applied to a self-propelled mobile type gantry crane carrier.
Figure 2:
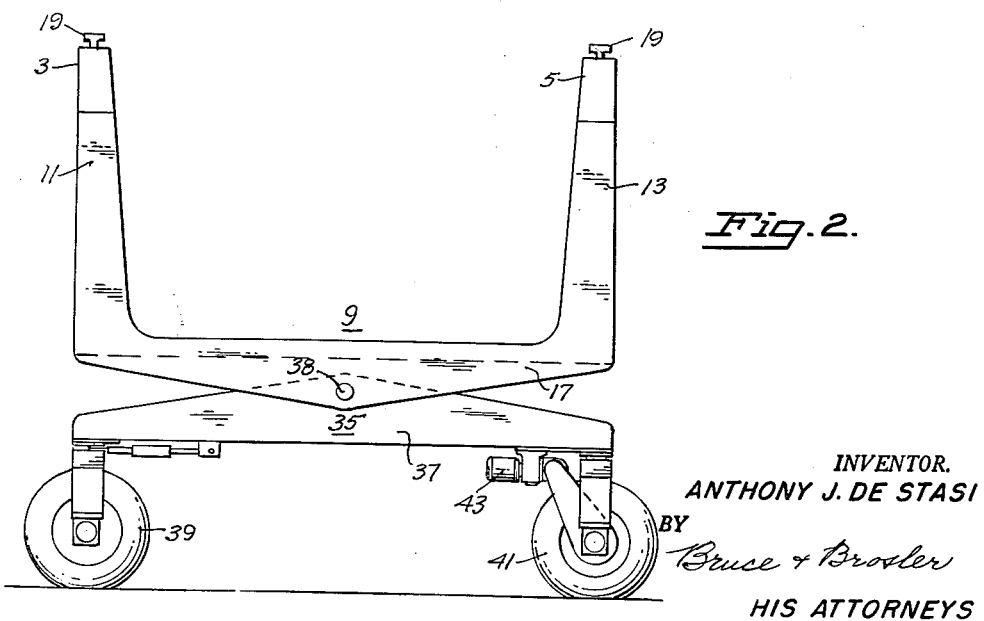
FIG. 2 is an elevational view of the carrier of FIG. 1 as viewed from one end.

Referring to the drawings for details of my invention in its preferred form, the carrier is depicted in the form of a gantry type crane which may be of any conventional type. Such crane may involve spaced parallel girders 3, 5 of a length sufficient to span the area of contemplated activity, the girders being supported upon the upper ends of a pair of parallel spaced U-shaped frames 7, 9, each of which includes upright legs 11, 13 connected at substantially their lower end by a cross beam 15, 17 respectively.

Each of the girders 3, 5 is provided with a rail 19, the two rails together comprising a track for supporting a trolley assembly 21 for movement from one end of the carrier to the other, the trolley assembly supporting a cargo clamping frame 22 adapted, in the present instance, for the support of a cargo container.

The trolley assembly may be of any known type; that which is illustrated, forming the subject matter of a pending application of Murray M. Montgomery for Cargo Container Handling Equipment, S.N. 97,834, filed March 23, 1961, now Pat. No. 3,061,110.

One of the end frames is supported on wheels 24, 25, at least one wheel at each lower corner thereof, the wheel 25 at one corner being a drive wheel, coupled to a drive motor 27 as by a chain and sprocket drive 29, the motor being supported on a bracket 31 suspended from the cross beam 15.

The remaining wheel 24 is of the castor type adapted for steering.

The carrier at its other end, is supported upon a truck assembly 35 involving a rocker beam 37 pivotally secured at its mid-point by a pivot pin 38 to the proximate cross beam 17 at substantially the mid-point thereof. At each end of the rocker arm is a supporting wheel 39, 41 respectively, one 41 of which is mounted in drive connection to a drive motor 43 in a manner similar to the drive wheel at the opposite end of the carrier, while the other wheel is mounted for steering in a manner corresponding to the other steering wheel also at the opposite end of the carrier.

Control of the trolley and driving of the carrier may be accomplished by an operator from an operator's station 45 provided at a conveniently located position such as on the end frame 7, from which point of advantage, the operator can control all operations with care and precision.

With one end of the carrier pivotally supported on a truck assembly as described, it will be apparent that regardless of normal obstacles or irregularities in the terrain over which the carrier may be travelling, ground contact at all four wheels may be maintained, and with a minimum of disturbance to the carrier structure and any load being carried thereby.

In the preferred construction, the cross beam 17 is preferably of inverted U-shape cross section to receive the rocker beam 37 of the truck assembly, and the rocker beam is preferably tapered to permit of sufficient rocking movement to accommodate the pivotal operations of the truck assembly to the maximum range of irregularities in the terrain over which movements of the carrier are contemplated.

While I have illustrated and described my invention in its preferred form, it will be apparent that the same is subject to alteration and modification without departing from the underlying principles involved, and I, accordingly, do not desire to be limited in my protection to the specific details illustrated and described, except as may be necessitated by the appended claims.

I claim:

1. A mobile cargo handling carrier comprising a pair of U-shape end frames, one of said end frames having a supporting wheel at each lower corner thereof, one of said wheels being a steering wheel, means for driving the other of said wheels, and means associated with said other end frame for stabilizing movement of said carrier over rough terrain, said means including a truck assembly involving a rocker arm and a supporting wheel at each end of said rocker arm, one of said wheels being a steering wheel, means for driving the other of said wheels, and means pivotally securing said truck assembly at an intermediate point of said rocker arm to the trough end of said other end frame.

2. A mobile cargo handling carrier comprising a pair of U-shape end frames, one of said end frames having a supporting wheel at each lower corner thereof, one of said wheels being a steering wheel, means for driving the other of said wheels, and means associated with said other end frame for stabilizing movement of said carrier over rough terrain, said means including a truck assembly involving a rocker arm and a supporting wheel at each end of said rocker arm, one of said wheels being a steering wheel, means for driving the other of said wheels, and means pivotally securing said truck assembly at an intermediate point of said rocker arm to the trough end of said other end frame at an intermediate point thereof.

3. A mobile cargo handling carrier comprising a pair of end frames of U-shape, girders connecting said end frames at the upper ends of said frames, and a trolley assembly supported on said girders for movement therealong, one of said end frames having a supporting wheel at each lower corner thereof, and means associated with said other frame for stabilizing movement of said carrier over rough terrain, said means including a truck assembly involving a rocker arm, a supporting wheel at each end of said rocker arm, and means pivotally securing said truck assembly at an intermediate point of said rocker arm to said other end frame at an intermediate point at the trough end thereof, and means for driving corresponding wheels at each end frame.

4. A mobile cargo handling carrier comprising a pair of end frames of U-shape, girders connecting said end frames at the upper ends of said frames, and a trolley assembly supported on said girders for movement therealong, one of said end frames having a supporting wheel at each lower corner thereof, and means associated with said other frame for stabilizing movement of said carrier over rough terrain, said means including a cross beam at the trough end of said other frame, said cross beam being of inverted U-shape channel, a truck assembly involving a rocker arm adapted to fit within said channel beam, with its ends spaced from said beam, a supporting wheel at each end of said rocker arm, means pivotally securing said truck assembly at an intermediate point of said rocker arm and within said channel beam at an intermediate point thereof, and means for driving at least one of the wheels at each end frame.

References Cited in the file of this patent
UNITED STATES PATENTS

| | | |
|---|---|---|
| 2,722,428 | Longbotham | Nov. 1, 1955 |
| 2,896,803 | Clifton | July 28, 1959 |
| 2,909,298 | Baudhuin | Oct. 20, 1959 |
| 3,059,782 | Baudhuin | Oct. 23, 1962 |